(12) United States Patent
Hisamitsu et al.

(10) Patent No.: US 7,282,297 B2
(45) Date of Patent: *Oct. 16, 2007

(54) LAMINATE CELL, ASSEMBLED BATTERY, BATTERY MODULE AND ELECTRIC VEHICLE

(75) Inventors: Yasunari Hisamitsu, Yokosuka (JP); Takaaki Abe, Yokosuka (JP); Takanori Ito, Zushi (JP); Osamu Shimamura, Yokohama (JP); Takamitsu Saito, Yokohama (JP); Hideaki Horie, Yokosuka (JP); Hiroshi Sugawara, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 575 days.

This patent is subject to a terminal disclaimer.

(21) Appl. No.: 10/640,323

(22) Filed: Aug. 14, 2003

(65) Prior Publication Data

US 2004/0038124 A1  Feb. 26, 2004

(30) Foreign Application Priority Data

Aug. 22, 2002 (JP) .......................... P 2002-242104

(51) Int. Cl.
*H01M 2/06* (2006.01)
*H01M 2/22* (2006.01)
*H01M 2/30* (2006.01)

(52) U.S. Cl. ................. 429/162; 429/161; 429/211; 429/178; 429/181

(58) Field of Classification Search ................. None
See application file for complete search history.

(56) References Cited

U.S. PATENT DOCUMENTS

| 6,242,128 B1* | 6/2001 | Tura et al. ................ 429/161 |
| 6,291,098 B1* | 9/2001 | Shibuya et al. ............ 429/163 |
| 2003/0027040 A1* | 2/2003 | Asahina et al. ........... 429/159 |
| 2003/0224246 A1* | 12/2003 | Watanabe et al. ......... 429/159 |

FOREIGN PATENT DOCUMENTS

JP  2000-200585 A  7/2000

* cited by examiner

*Primary Examiner*—Jonathan Crepeau
(74) *Attorney, Agent, or Firm*—McDermott Will & Emery LLP (57) ABSTRACT

A laminate cell comprises a power generating element formed by sequentially stacking positive electrode plates and negative electrode plates while interposing separators therebetween; a cell package formed of a metal composite film, the cell package hermetically sealing the power generating element and an electrolyte; a positive tab connected to the positive electrode plates; and a negative tab connected to the negative electrode plates. According to the laminate cell, the power generating element and the cell package have approximately rectangular plane shapes, and the positive tab and the negative tab are drawn outward from end edges of long sides of the cell package.

14 Claims, 8 Drawing Sheets

LAMINATE CELL, ASSEMBLED BATTERY, BATTERY MODULE AND ELECTRIC VEHICLE

BACKGROUND OF THE INVENTION

1. Field of the Invention

The present invention relates to a laminate cell having a structure, in which a metal composite film is used for a cell package hermetically sealing a power generating element and an electrolyte, and in which positive and negative tabs are drawn from the end edges of this cell package to the outside. The present invention also relates to an assembled battery, a battery module, and an electric vehicle, all of which use this laminate cell.

2. Description of the Related Art

In recent years, an electric vehicle which uses electricity as a power source and a hybrid car which runs by a combination of an engine and a motor have attracted attention due to the global problem of environmental air pollution caused by automobile exhaust gas. Thus, the development of a high-power battery to be mounted in these types of vehicles, which achieves high energy/power densities, occupies an important position in the industry.

Regarding this type of high-power battery, for example, there is a lithium ion battery. Specifically, among this type of battery, there is a laminate cell formed by stacking flat positive and negative electrode plates upon one another while interposing separators therebetween.

As for this laminate cell, one disclosed in Japanese Patent Application Laid-Open No. 2000-200585 has been proposed, which uses, as a cell package, a laminate film formed by stacking a metal film and a polymer film. In this specification, the laminate film is referred to as a metal composite film. This laminate cell is constructed in a such manner that a power generating element composed of positive and negative electrode plates and separators, all of which have an approximately rectangular flat shape, are hermetically sealed together with an electrolyte by the cell package made of the metal composite film, and a positive tab connected to the positive electrode plates of the power generating element and a negative tab connected to the negative electrode plates thereof are drawn outward from the end edges of the cell package.

The laminate cell thus constructed has an advantage in that it is easier to reduce the weight and thickness thereof in comparison with one which uses a metal can as the cell package.

Incidentally, in the laminate cell thus constructed, it is common that, the positive tab connected to the positive electrode plates of the power generating element and the negative tab connected to the negative electrode plates thereof are drawn outward from the end edges of the short sides of the cell package made of the metal composite film from the viewpoint of securing the sealing capability, and the like.

SUMMARY OF THE INVENTION

However, in recent years, the areas of the positive and negative electrode plates have been gradually increasing in order to realize an increase in battery capacity. When the areas of the positive and negative electrode plates are increased in such a way, the length of conductive paths from the centers of the positive and negative electrode plates to the ends of the positive and negative tabs greatly affects the internal resistance of the laminate cell.

Therefore, when a structure is adopted, in which the positive and negative tabs are drawn from the short sides of the cell package to the outside as in the conventional laminate cell, the internal resistance will be increased due to the elongation of the length of the conductive paths, thus causing a problem in that this increase of the internal resistance, hinders the increase of the battery power.

The present invention was made in consideration of the above-described problems. It is an object of the present invention to provide a laminate cell capable of attaining higher power by reducing internal resistance, and to provide an assembled battery, a battery module, and an electric vehicle, all of which use this laminate cell.

The first aspect of the present invention provides a laminate cell, comprising: a power generating element formed by sequentially stacking positive electrode plates and negative electrode plates while interposing separators therebetween; a cell package formed of a metal composite film, the cell package hermetically sealing the power generating element and an electrolyte; a positive tab connected to the positive electrode plates; and a negative tab connected to the negative electrode plates, wherein the power generating element and the cell package have approximately rectangular plane shapes, and the positive tab and the negative tab are drawn outward from end edges of long sides of the cell package.

The second aspect of the present invention provides an assembled battery, comprising: a single cell including a power generating element formed by sequentially stacking positive electrode plates and negative electrode plates while interposing separators therebetween; a cell package formed of a metal composite film hermetically sealing the power generating element and an electrolyte; a positive tab connected to the positive electrode plates; and a negative tab connected to the negative electrode plates, wherein the power generating element and the cell package have approximately rectangular plane shapes, the positive tab and the negative tab are drawn outward from end edges of long sides of the cell package, and the assembled battery is formed by interconnecting any of a plurality of the single cells and a plurality of single cell groups electrically in series, each of the single cell group being formed by interconnecting a plurality of the single cells electrically in parallel.

The third aspect of the present invention provides a battery module, comprising: an assembled battery having a single cell including a power generating element formed by sequentially stacking positive electrode plates and negative electrode plates while interposing separators therebetween; a cell package formed of a metal composite film hermetically sealing the power generating element and an electrolyte; a positive tab connected to the positive electrode plates; and a negative tab connected to the negative electrode plates, wherein the power generating element and the cell package have approximately rectangular plane shapes, the positive tab and the negative tab are drawn outward from end edges of long sides of the cell package, the assembled battery is formed by interconnecting any of a plurality of the single cells and a plurality of single cell groups electrically in series, each of the single cell group being formed by interconnecting a plurality of the single cells electrically in parallel, and the battery module is formed by electrically interconnecting a plurality of the assembled batteries and housing the plurality of electrically interconnected assembled batteries in a module case.

The fourth aspect of the present invention provides an electric vehicle, comprising: a battery module comprising:

an assembled battery having a single cell including a power generating element formed by sequentially stacking positive electrode plates and negative electrode plates while interposing separators therebetween; a cell package formed of a metal composite film hermetically sealing the power generating element and an electrolyte; a positive tab connected to the positive electrode plates; and a negative tab connected to the negative electrode plates, wherein the power generating element and the cell package have approximately rectangular plane shapes, the positive tab and the negative tab are drawn outward from end edges of long sides of the cell package, the assembled battery is formed by interconnecting any of a plurality of the single cells and a plurality of single cell groups electrically in series, each of the single cell group being formed by interconnecting a plurality of the single cells electrically in parallel, the battery module is formed by electrically interconnecting a plurality of the assembled batteries and housing the plurality of electrically interconnected assembled batteries in a module case, and the battery module is used as a power source for a driving motor driving drive wheels.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

First Embodiment

Figure 1:
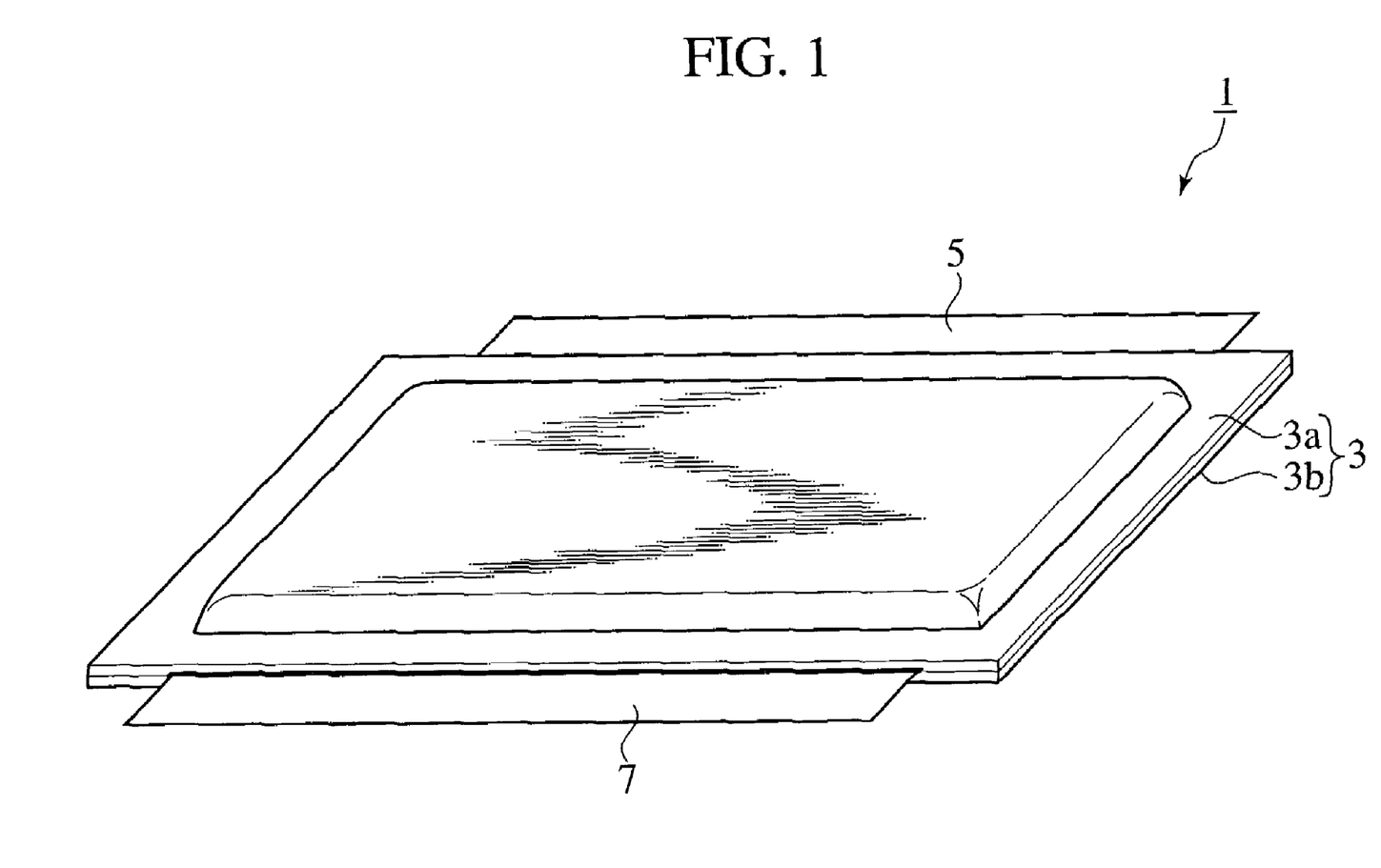
FIG. 1 is a perspective view illustrating an example of a laminate cell according to the present invention.
Figure 2:
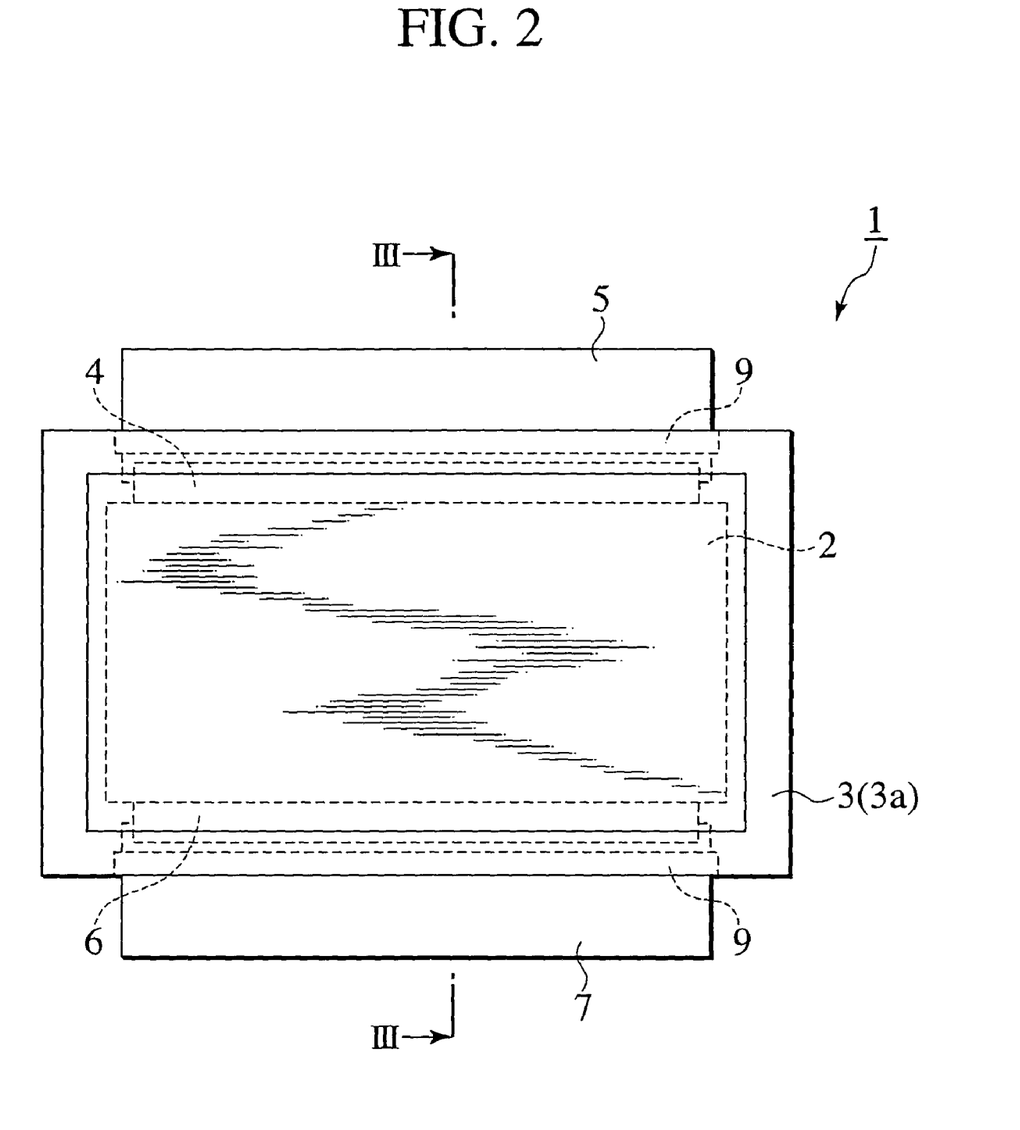
FIG. 2 is a plan view illustrating an internal structure of the laminate cell according to the present invention.
Figure 3:
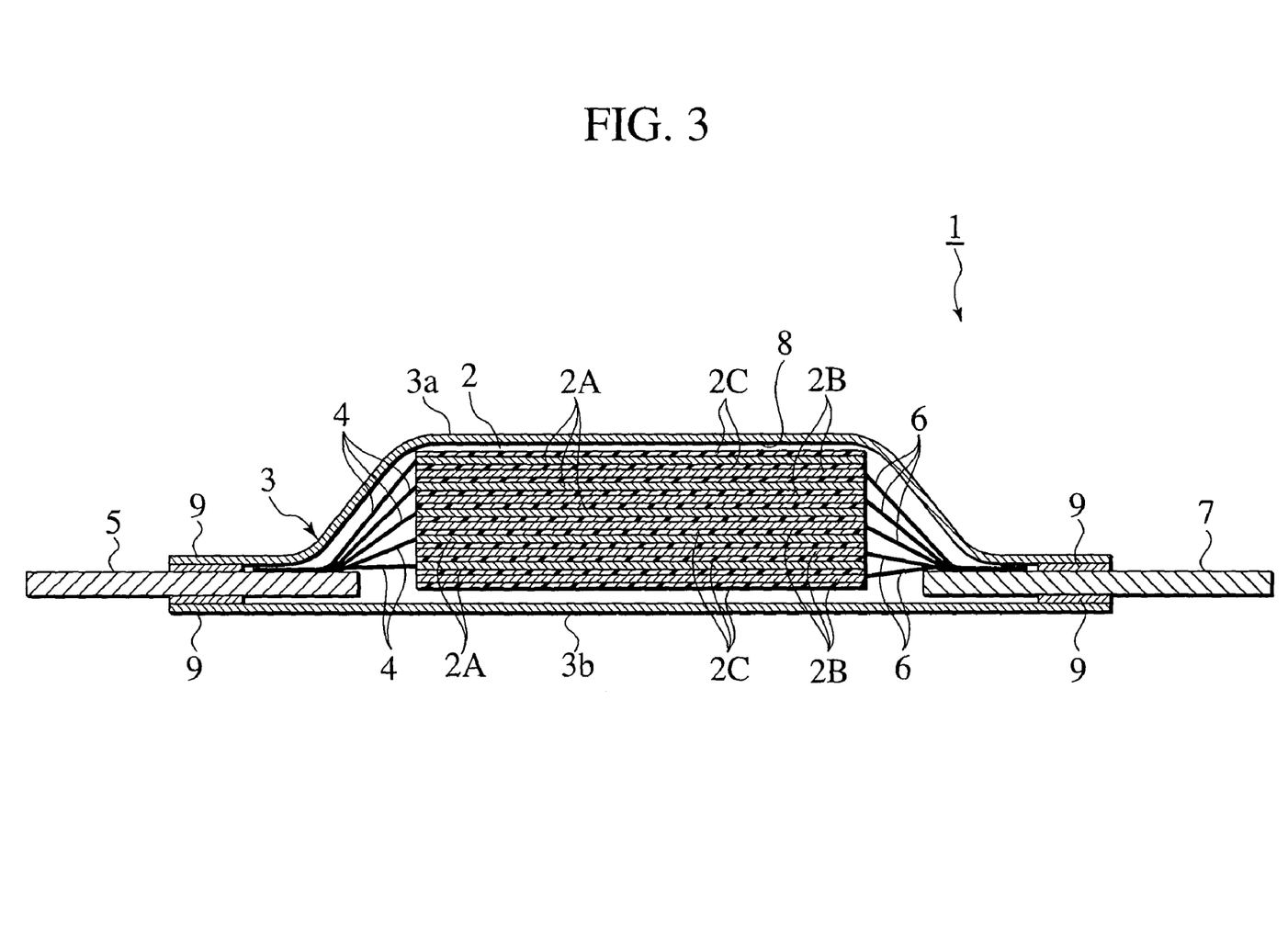
FIG. 3 is a cross sectional view taken on line III-III of FIG. 2.

As illustrated in FIGS. 1 to 3, the laminate cell 1 of this embodiment includes the stacked electrode 2 as a power generating element. The stacked electrode 2 is located between the center portions of the pair of metal composite films 3a and 3b constituting the cell package 3, and is hermetically sealed together with an electrolyte so as to be sandwiched between the pair of metal composite films 3a and 3b in the thickness direction.

As illustrated in FIG. 3, the stacked electrode 2 as the power generating element is formed by sequentially stacking the pluralities of positive and negative electrode plates 2A and 2B while interposing the separators 2C therebetween. As illustrated in FIG. 2, a plane shape thereof is formed so as to be approximately rectangular. The respective positive electrode plates 2A constituting the stacked electrode 2 are connected to the positive tab 5 as one of the electrode terminals through the positive leads 4. Moreover, the negative electrode plates 2B constituting the stacked electrode 2 are connected to the negative tab 7 as the other electrode terminal through the negative leads 6.

Each of the positive and negative leads 4 and 6 is formed of metal foil. Specifically, the positive leads 4 are made of aluminum foil, and the negative leads 6 are formed of copper foil. Then, the positive leads drawn from the positive electrode plates 2A of the stacked electrode 2 are layered and joined onto the positive tab 5 by a technique such as welding. Moreover, the negative leads 6 drawn from the negative electrode plates 2B are layered and joined onto the negative tab 7 by a technique such as welding.

Each of the positive and negative tabs 5 and 7 is formed of a metal plate. Specifically, for example, the positive tab 5 is formed of an aluminum plate, and the negative tab 7 is formed of a nickel plate. Then, one ends of the positive and negative tabs 5 and 7 are drawn outward from the end edges of the cell package 3, and constitute positive and negative terminals, respectively.

Each of the pair of metal composite films 3a and 3b constituting the cell package 3 is formed in a manner described below. For example, a metal layer made of aluminum or the like is used as a base material, a resin layer made of polyethylene (PE) or polypropylene (PP) is coated on the inside surface of the metal layer, and a protection layer such as nylon is adhered onto the outside surface of the metal layer. The metal composite films 3a and 3b are formed into a rectangular sheet shape somewhat larger than the stacked electrode 2 so as to correspond to the shape of the stacked electrode 2. In addition, the metal composite film 3a is formed into a cup shape, in which the concave portion 8 housing the stacked electrode 2 is provided on the center portion. The metal composite film 3b is formed flat so as to cover the opening portion of the concave portion 8.

When the laminate cell 1 is fabricated, the stacked electrode 2 is housed together with the electrolyte in the concave portion 8 provided in the metal composite film 3a, and the flat metal composite film 3b is disposed so as to cover the concave portion 8. This is followed by heat sealing of the outer circumferential portions of the pair of metal composite films 3a and 3b. Thus, a structure is made, in which the stacked electrode 2 is hermetically sealed together with the electrolyte by the cell package 3.

As a basic structure, the structure as described above is constructed. In addition to this, as illustrated in FIGS. 1 and 2, the laminate cell 1 of this embodiment is such that the positive tab 5 connected to the respective positive electrode plates 2A of the stacked electrode 2 through the positive leads 4 and the negative tab 7 connected to the respective negative electrode plates 2B thereof through the negative leads 6 are drawn from the end edges of the long sides of the cell package 3 to the outside thereof, respectively. Specifically, in the laminate cell 1 of this embodiment, the positive and negative tabs, which have been drawn outward from the end edges of the short sides of the cell package in this type of conventional laminate cell, are drawn outward from the end edges of the long sides of the cell package.

In the case where the positive and negative tabs 5 and 7 are drawn from the end edges of the long sides of the cell package 3 to the outside thereof, regions are made larger, where the positive and negative tabs 5 and 7 are interposed between the metal composite films 3a and 3b, in the thermally bonded outer circumferential portions thereof. Therefore, the lowering of the sealing capability of the metal composite films 3a and 3b, that is, the lowering of the sealing capability of the cell package 3 can cause concern. However, in the laminate cell 1 of this embodiment, as illustrated in FIGS. 2 and 3, the resin sheets 9 are wound around parts of the positive and negative tabs 5 and 7 disposed in the thermally sealed portions of the metal composite films 3a and 3b. In addition, in the portion where the positive or negative tab 5 or 7 is interposed, the metal composite films 3a and 3b are thermally bonded integrally with the resin sheet 9. Accordingly, adhesiveness in the circumferences of the positive and negative tabs 5 and 7 during the heat sealing is ensured, as is the sealing capability of the cell package 3.

Figure 4A:
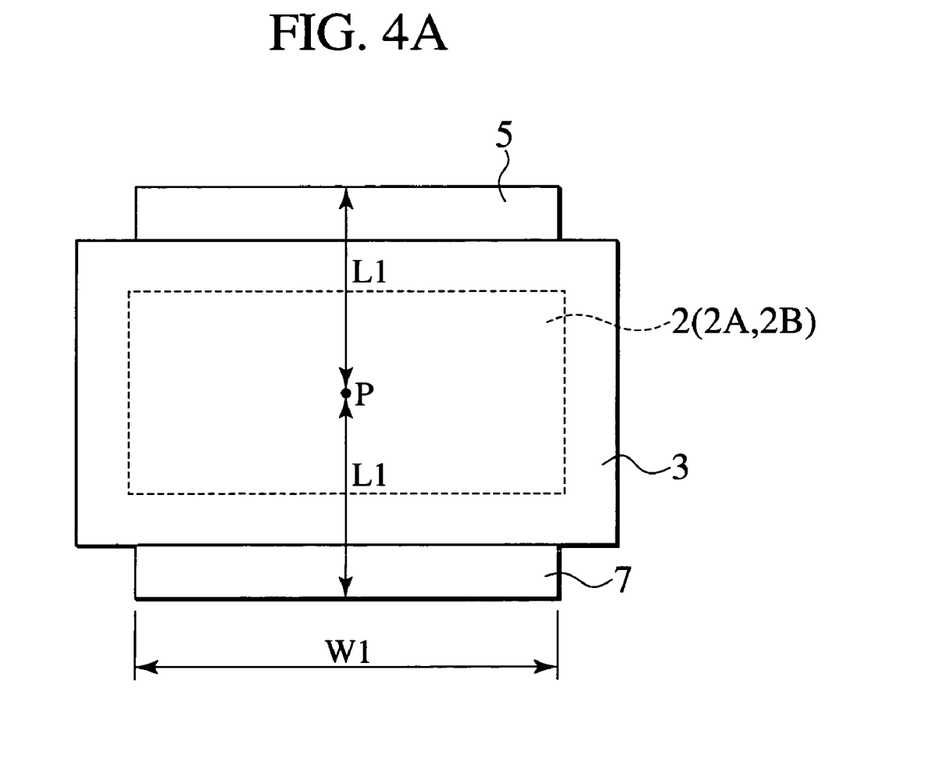
FIG. 4A is a plan view illustrating the laminate cell according to the present invention.
Figure 4B:
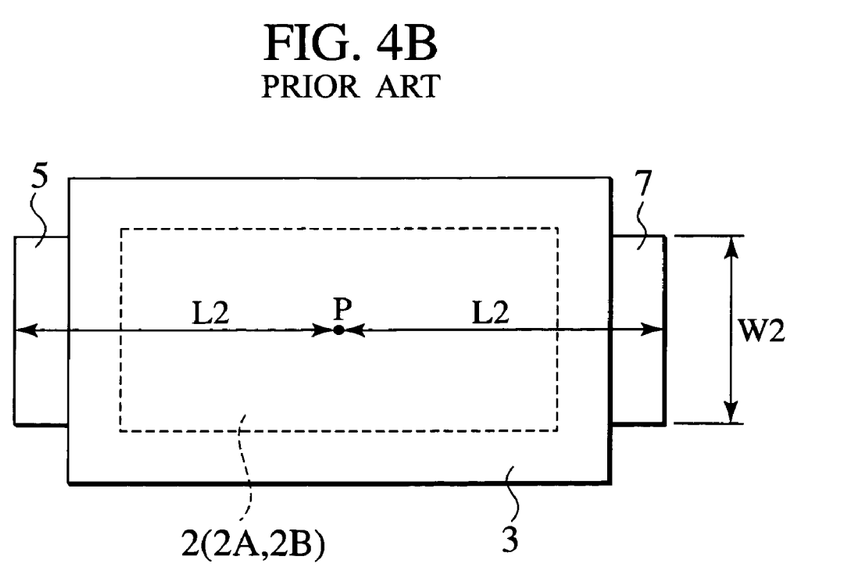
FIG. 4B is a plan view illustrating a laminate cell of a comparative example.

Here, the advantage of the laminate cell 1 of this embodiment, which is constituted such that the positive and negative tabs 5 and 7 are drawn outward from the end edges of the long sides of the cell package 3, will be described with reference to FIGS. 4A and 4B. Note that FIG. 4A illustrates the laminate cell 1 of this embodiment, in which the positive and negative tabs 5 and 7 are drawn from the end edges of the long sides of the cell package 3, and that FIG. 4B illustrates a comparative example, in which the positive and negative tabs 5 and 7 are drawn from the end edges of the short sides of the cell package 3, though the basic structure thereof is similar to that of the laminate cell 1 of this embodiment.

In the laminate cell 1 thus constructed, the internal resistance thereof greatly depends on the length and width of the paths (conductive paths) from the centers P of the positive and negative electrode plates 2A and 2B to the ends of the positive and negative tabs 5 and 7. If the length of the conductive paths is made shorter, the internal resistance becomes smaller. If the width of the conductive paths becomes larger, the internal resistance becomes smaller. Here, the laminate cell 1 of this embodiment, which is illustrated in FIG. 4A, is adapted such that the positive and negative tabs 5 and 7 are drawn outward from the end edges of the long sides of the cell package 3. Therefore, the length L1 of the conductive paths becomes shorter than the length L2 of the conductive paths in the comparative example, which is illustrated in FIG. 4B. Moreover, the width W1 of the conductive paths in the laminate cell 1 of this embodiment becomes larger than the width W2 of the conductive paths in the comparative example. Hence, in the laminate cell 1 of this embodiment, the lowering of the internal resistance is achieved to realize higher power in comparison with the comparative example in which the positive and negative tabs 5 and 7 are drawn outward from the end edges of the short sides of the cell package 3.

In the laminate cell 1 of this embodiment, the lowering of the internal resistance thereof allows control of the temperature increase of the positive and negative tabs 5 and 7. The fact that the temperature increase of the positive and negative tabs 5 and 7 is controlled as described above, is advantageous in ensuring durability and reliability, particularly in the laminate cell 1 of this embodiment, which uses the metal composite films 3a and 3b for the cell package 3.

In the laminate cell 1 of this embodiment, each of the metal composite films 3a and 3b constituting the cell package 3 has a structure in which the resin layer is coated on the inside surface of the metal layer. Therefore, when the temperatures of the positive and negative tabs 5 and 7 are excessively increased, in some cases, the resin layers of the metal composite films 3a and 3b are melted, the metal layers are exposed, and an electrical short circuit occurs between the metal layers and the positive and negative tabs 5 and 7 or the positive and negative leads 4 and 6. However, as described above, in the laminate cell 1 of this embodiment, lowering of the internal resistance is achieved by drawing the positive tabs 5 and 7 outward from the end edges of the long sides of the cell package 3, and the temperature increase of the positive and negative tabs 5 and 7 is effectively controlled. Therefore, above-described can be prevented.

It is possible to apply the laminate cell 1 of this embodiment as described above as, for example, a lithium ion secondary battery. However, it is possible to apply the present invention as another battery having a similar constitution to that of the lithium ion secondary battery without being limited thereto.

The laminate cell 1 of the present embodiment can be employed as a lithium ion secondary battery. Hereinafter, the materials of the lithium ion battery are additionally explained.

As a positive electrode active material forming the positive electrode plate 2A of the stacked electrode 2, a compound is contained that includes lithium nickel composite oxides, in particular, compounds expressed by a general formula $LiNi_{1-x}M_xO_2$. Here, x lies in a range of $0.01 \leq x \leq 0.5$, and M represents at least one element selected from iron (Fe), cobalt (Co), manganese (Mn), copper (Cu), zinc (Zn), aluminum (Al), tin (Sn), boron (B), gallium (Ga), chromium (Cr), vanadium (V), titanium (Ti), magnesium (Mg), calcium (Ca) and strontium (Sr).

Further, the positive electrode may contain positive electrode active material other than the lithium nickel composite oxides. This material may include lithium manganese composite oxides that form compounds expressed by a general formula $Li_yMn_{2-z}M'_zO_4$. Here, y lies in a range of $0.9 \leq y \leq 1.2$ while z lies in a range of $0.01 \leq z \leq 0.5$, and M' represents at least one element selected from Fe, Co, Ni, Cu, Zn, Al, Sn, B, Ga, Cr, V, Ti, Mg, Ca and Sr. Alternately, this material may include lithium cobalt composite oxides that form compounds expressed by a general formula $LiCo_{1-x}M''_xO_2$. Here, x lies in a range of $0.01 \leq x \leq 0.5$, and M'' represents at least one element selected from Fe, Ni, Mn, Cu, Zn, Al, Sn, B, Ga, Cr, V, Ti, Mg, Ca and Sr.

Although there are no particular limitations in the manufacturing methods of the lithium nickel composite oxides, the lithium manganese composite oxides and the lithium cobalt composite oxides, these compounds may be obtained by mixing carbonates such as lithium, nickel, manganese and cobalt at ratios depending on constituents thereof and baking these carbonates in a temperature ranging from 600° C. to 1000° C. Also, the starting materials may not be limited to the carbonates and can also be similarly synthesized from hydroxides, oxides, nitrates and organic acid salts.

Also, the positive electrode material such as the lithium nickel composite oxides and the lithium manganese composite oxides should preferably have an average particle size of 30 μm or below.

Further, the negative electrode plate 2B of the stacked electrode 2 is formed of the negative electrode active material with a specific surface area in a range from 0.05 m²/g to 2 m²/g. As a result of the negative electrode material with the specific surface area of the above range, it is possible to adequately restrict an excessive amount of a solid electrolyte interface layer (SEI layer) from being formed on the negative electrode surface.

With the negative electrode active material having a specific surface area of less than 0.05 m²/g, since the area available for lithium ions to transfer is extremely small, the lithium ions doped into the negative electrode active material during the charging cycle become too hard to be sufficiently doped out from the negative electrode active material during the discharging cycle, resulting in deterioration in the charging and discharging efficiency. Conversely, with the negative electrode active material having a specific surface area of greater than 2 m$^2$/g, it is difficult to control an excessive amount of the SEI layer from being formed on the negative electrode surface.

The negative electrode active material may include any material that allows the lithium ions to be doped into or out of the material at a voltage versus lithium of less than 2.0 volts. More particularly, carbonaceous materials may be used which involve a non-graphitizable carbon material, artificial graphite, natural graphite, pyrolytic graphite, cokes including pitch coke, needle coke and petroleum coke, graphite, glassy carbon, a sintered material of polymers formed by baking and carbonizing phenol resin or furan resin at an appropriate temperature, carbon fiber, activated carbon and carbon black.

Further, a metal, that is able to form an alloy with lithium, and an alloy thereof can also be used and, in particular, these materials include oxide products or nitride products, that allow the lithium ions to be doped into or out of the material at a relatively low voltage potential, such as iron oxide, ruthenium oxide, molybdenum oxide, tungsten oxide, tin oxide and main group elements of group 13. In addition thereto, these materials include elements such as silicon (Si) and tin (Sn), or alloys of Si and Sn represented by a formula $M_x$Si and $M_x$Sn (wherein M represents more than one metallic element except for Si or Sn). Among these, it is particularly preferable for Si or the Si alloys to be used.

Further, the electrolyte may include a liquid state, a so-called electrolysis solution composed of electrolyte salts dissolved in and adjusted in a non-aqueous solvent, polymer gel electrolyte composed of the electrolyte salt dissolved in the non-aqueous solvent which is retained in a polymer matrix, and polymer electrolyte composed of the electrolyte salt dissolved in the polymer.

When using the polymer gel electrolyte as the non-aqueous electrolyte, the polymer to be used includes poly (vinylidene fluoride) and polyacrylonitrile. Also, when using the polymer electrolyte, a polymer of polyethylene oxide (PEO) may be used.

The non-aqueous solvent may include any kind of solvent if it remains in a non-aqueous solvent heretofore used in a secondary battery using such kinds of non-aqueous electrolyte. As the non-aqueous solvent, propylene carbonate, ethylene carbonate, 1,2-dimethoxyethane, diethyl carbonate, dimethyl carbonate, γ-butyrolactone, tetrahydrofuran, 1,3-dioxolane, 4-methyl-1,3-dioxolane, diethylether, sulfolane, methyl sulfolane, acetonitrile and propionitrile can be used. Also, these non-aqueous solvents may be used as a single kind or in a mixture of more than two kinds.

Particularly, the non-aqueous solvent should preferably contain an unsaturated carbonate. Particularly, it is more preferable for the non-aqueous solvent to contain vinylene carbonate. The presence of the unsaturated carbonate contained as the non-aqueous solvent enables an effect, derived in the negative electrode active material from the property (a function of a protective layer) of the SEI layer, to be obtained and it is conceivable that an excessive discharging-resistant characteristic is further improved.

Further, the unsaturated carbonate should be preferably contained in the electrolyte in a range from 0.05 wt % to 5 wt % and, more preferably, in a range from 0.5 wt % to 3 wt %. With the amount of content of the unsaturated carbonate being weighed in the above range, a non-aqueous secondary battery is provided which has a high initial discharging capacity with a high energy density.

The electrolyte salt may not be limited to a particular composition provided that it forms a lithium salt presenting an ion conductivity and may include $LiClO_4$, $LiAsF_6$, $LiPF_6$, $LiBF_4$, $LiB(C_6H_5)_4$, LiCl, LiBr, $CH_3SO_3Li$ and $CF_3SO_3Li$. The electrolyte salt may be used as a single kind or may be possibly used in a mixture of more than two kinds.

The laminate cell 1 of the present invention has been specifically described above in a case where the laminate cell 1 is employed as the lithium ion secondary battery. However, the present invention is not limited to the lithium ion secondary battery, and can be applied to a cell having a similar constitution.

Second Embodiment

Next, another embodiment of the laminate cell to which the present invention is applied will be described with reference to FIG. 5.

Figure 5:
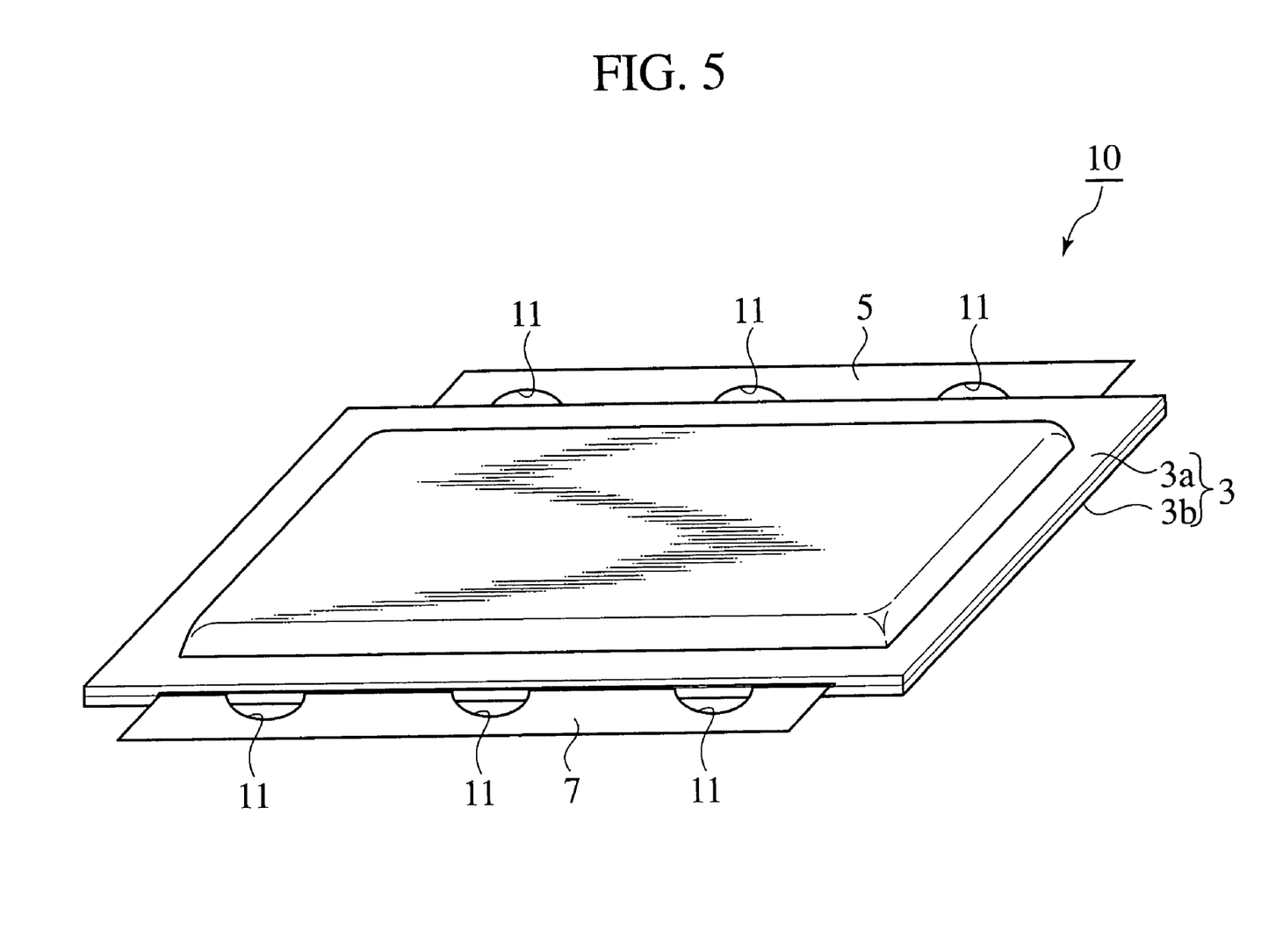
FIG. 5 is a perspective view illustrating another example of the laminate cell according to the present invention.

As illustrated in FIG. 5, the laminate cell 10 of this embodiment is such that the opening holes 11 are provided on the portions of the positive and negative tabs 5 and 7 drawn outward from the end edges of the long sides of the cell package 3, the portions being overlapped with the end edges of the cell package 3. In such a way, the sealing capability of the pair of metal composite films 3a and 3b constituting the cell package 3, that is, the sealing capability of the cell package 3 can be further enhanced. Note that, because other constitutions of the laminate cell 10 are similar to those of the above-mentioned laminate cell 1 of the first embodiment, the same reference numerals are given to such similar portions in FIG. 5, and repeated description is omitted.

In the laminate cell 10 of this embodiment, the shape of the opening holes 11 provided in the positive and negative tabs 5 and 7 maybe any shape. In addition, it is also possible to arbitrarily set the number of opening holes 11. Moreover, the opening holes 11, of which number is sufficient to attain the sealing capability of the cell package 3 securely, may be provided in the positive and negative tabs 5 and 7 in accordance with the thicknesses and lengths of the positive and negative tabs 5 and 7, and the heat sealing characteristics of the pair of metal composite films 3a and 3b constituting the cell package 3, and the like.

When fabricating the laminate cell 10 as described above, the opening holes 11 are drilled in advance in the positive and negative tabs 5 and 7 by a technique such as punching. Then, the positive and negative tabs 5 and 7 in which the opening holes 11 are drilled are connected to the positive and negative electrode plates of the stacked electrode, respectively. Subsequently, the stacked electrode to which the positive and negative tabs 5 and 7 are connected is located together with the electrolyte between the metal composite films 3a and 3b. In this case, portions in which the opening holes 11 are pierced are adapted so as to be overlapped with the end edges of the metal composite films 3a and 3b, that is, the end edges of the cell package 3. Then, after making the laminate cell 10 as described above, the outer circumferential portions of the metal composite films 3a and 3b constituting the cell package 3 are thermally bonded.

In such a way, in the portions in which the opening holes 11 are formed, the positive and negative tabs 5 and 7 are not interposed between the metal composite films 3a and 3b. Therefore, the adhesiveness of the metal composite films 3a and 3b during the heat sealing can be enhanced, and eventually, it is possible to further enhance the sealing capability of the cell package 3.

As described above, in the laminate cell 10 of this embodiment, an increase of the battery power is realized by drawing the positive and negative tabs 5 and 7 outward from the end edges of the long sides of the cell package 3. Furthermore, the opening holes 11 are provided in the positive and negative tabs 5 and 7, and the pair of metal composite films 3a and 3b constituting the cell package 3 are thermally bonded in the portions where the opening holes 11 are provided, and thus a further enhancement of the sealing capability of the cell package 3 is achieved. Hence, in the laminate cell 10, a problem of the leakage of the electrolyte or the like, which is caused by the lowering of the sealing capability of the cell package 3, can be effectively controlled for a long period of time, thus making it possible to enhance the durability thereof.

Third Embodiment

Figure 6:
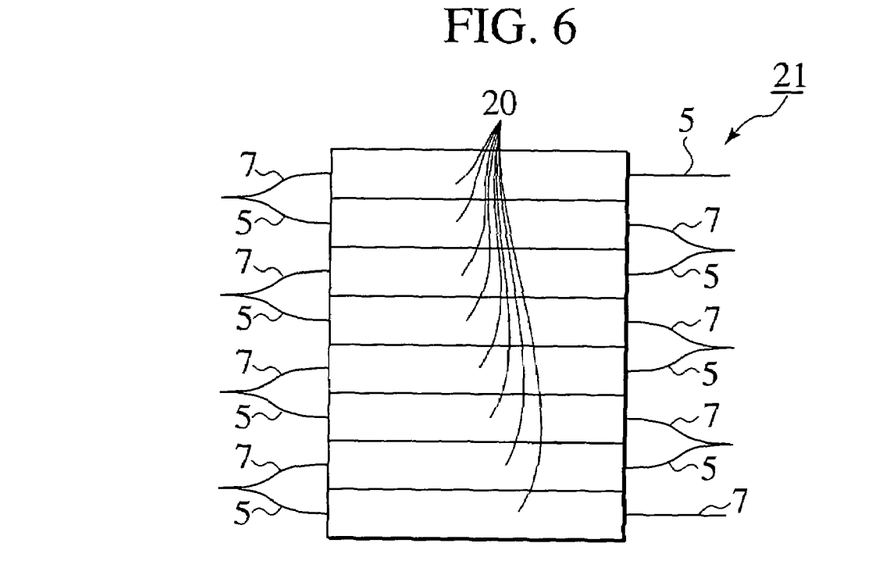
FIG. 6 is a side view illustrating an example of an assembled battery according to the present invention.

Next, an assembled battery composed of the laminate cells to which the present invention is applied will be described with reference to FIGS. 6 and 7. FIG. 6 illustrates the assembled battery 21 composed by interconnecting the plurality of single cells 20 electrically in series, in which the laminate cells (laminate cells 1 or 10 mentioned above) to which the present invention is applied are made as the single cells 20. Meanwhile, FIG. 7 illustrates the assembled battery 23 composed by interconnecting the plurality of single cell groups 22 electrically in series, in which the plurality of single cells 20 are interconnected electrically in parallel so as to make the single cell groups 22.

The assembled battery 21 illustrated in FIG. 6 is formed by stacking and integrating the plurality of single cells 20 in the thickness direction. The respective single cells 20 constituting the assembled battery 21 are stacked such that the directions of the positive and negative tabs 5 and 7 of the adjacent single cells 20 alternate. With regard to a single cell 20 in which other single cells 20 are stacked on both sides in the thickness direction, respectively, the positive tab 5 of said single cell 20 is joined to the negative tab 7 of one of the adjacent single cells 20 by a technique such as ultrasonic bonding, and the negative tab 7 thereof is joined to the positive tab 5 of the other adjacent single cell 20. In such a way, the positive and negative tabs 5 and 7 of all of the single cells 20 are joined to the negative and positive tabs 7 and 5 of the adjacent single cells 20, respectively, and thus the integrated assembled battery 21 in which the respective single cells 20 are interconnected electrically in series is composed.

Figure 7:
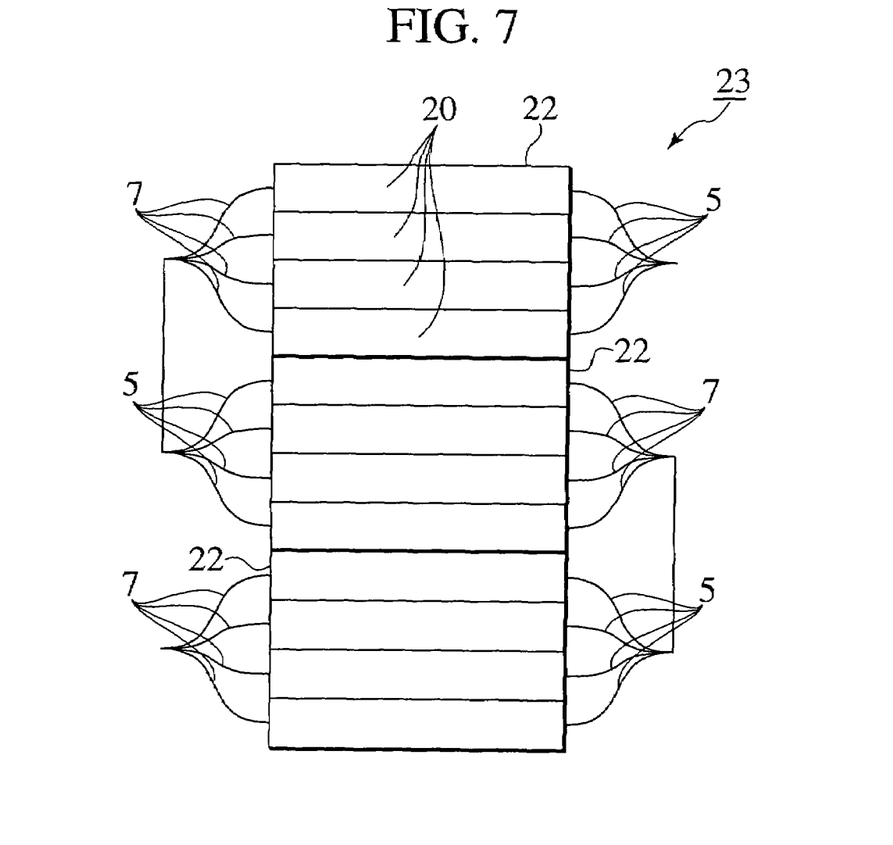
FIG. 7 is a side view illustrating another example of the assembled battery according to the present invention.

Meanwhile, the assembled battery 23 illustrated in FIG. 7 is composed by combining the single cell groups 22, each of which is formed by interconnecting the plurality of single cells 20 electrically in parallel. The plurality of single cells 20 are stacked such that the directions of the positive and negative tabs 5 and 7 of the adjacent single cells 20 is the same, and the positive tabs 5 and negative tabs 7 of these single cells 20 are individually interconnected by a technique such as the ultrasonic bonding. Thus, the single cell groups 22 constituting the assembled battery 23 are formed by interconnecting the single cells 20 electrically in parallel. Then, the single cell groups 22 thus constituted as aggregations of the plurality of single cells 20 are stacked such that the directions of the positive and negative tabs 5 and 7 of the adjacent single cell groups 22 alternate. With regard to a single cell group 22 in which other single cell groups 22 are layered on both sides in the thickness direction, respectively, the positive tabs 5 of said single cell group 22 are connected to the negative tabs 7 of one of the adjacent single cell groups 22. Meanwhile, the negative tabs 7 of said single cell group 22 are connected to the positive tabs 5 of the other adjacent single cell group 22. In such a way, the positive and negative tabs 5 and 7 of all of the single cell groups 22 are connected to the negative and positive tabs 7 and 5 of the adjacent single cell groups 22, respectively, and thus the integrated assembled battery 23 in which the respective single cell groups 22 are interconnected electrically in series is composed.

Note that the number of single cells 20 constituting the assembled batteries 21, 23 as described above is arbitrary, and it is satisfactory to set the number appropriately in accordance with the purpose of the concerned assembled batteries 21 and 23.

In the assembled batteries 21 and 23 thus constituted, the plurality of single cells 20 are compactly identified, and therefore, energy efficiency per unit volume is high. In this connection, it is possible to apply the assembled batteries 21 and 23 to a variety of purposes. Particularly, regarding each of the single cells 20 constituting the assembled batteries 21 and 23, the laminate cell 1 or 10 is used, which has a structure in which the positive and negative tabs 5 and 7 are drawn outward from the end edges of the long sides of the cell package. Thus, high power is obtained for each of the single cells 20. Therefore, the assembled batteries 21 and 23 are suitable for, for example, use in an electric vehicle regarding high power.

Fourth Embodiment

Figure 8:
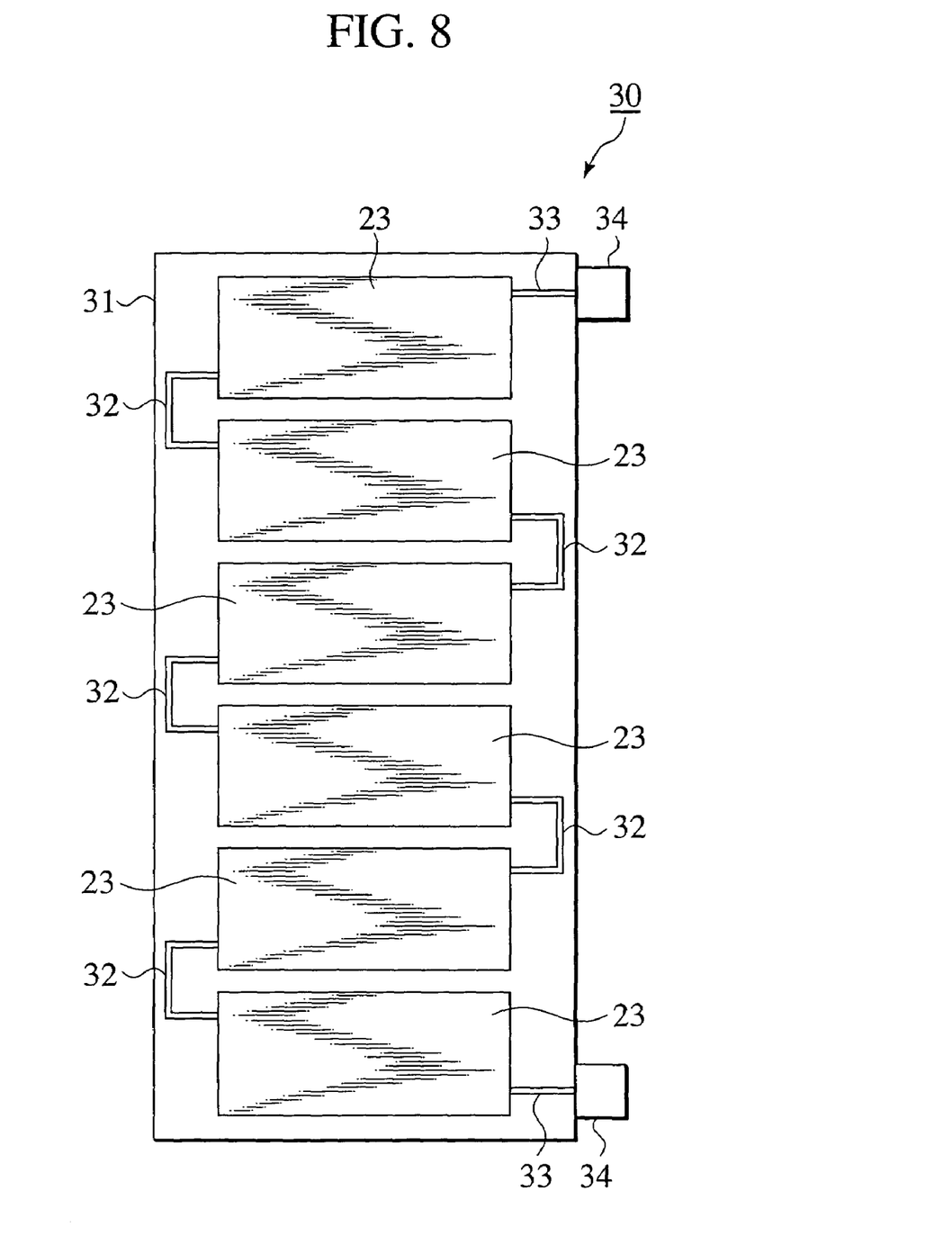
FIG. 8 is a plan view illustrating a battery module according to the present invention.

Next, an example of a battery module composed of the assembled batteries 21 or 23 as described above will be described with reference to FIG. 8. FIG. 8 illustrates the battery module 30 having a structure in which the plurality of assembled batteries 23 illustrated in FIG. 7 are interconnected electrically in series. Note that the assembled batteries 21 constructed as illustrated in FIG. 6 may also be used. In addition, the connection mode of the plurality of assembled batteries is not limited to a serial connection, but any mode including parallel connection, parallel-serial connection, serial-parallel connection and the like may be adopted. Moreover, the number of assembled batteries constituting the battery module 30 is also arbitrary and may be appropriately set in accordance with the purpose of the concerned battery module 30.

The battery module 30 of this embodiment is constructed in such a manner that the box-shaped module case 31 is provided so that the plurality of assembled batteries 23 are housed in the module case 31 in a state wherein they are interconnected electrically in series. The respective terminals (aggregate positive and negative tabs 5 and 7) of each of the assembled batteries 23 housed in the module case 31 are connected to the terminals of the adjacent assembled batteries 23 through the busbars 32. Then, the terminals of the assembled batteries 23 disposed on the outermost sides among the plurality of assembled batteries 23 are connected to the external terminals 34 provided on the outside surface of the module case 31.

In the battery module 30 thus constituted, the assembled batteries 23 having high energy efficiency per unit volume are housed in the module case 31 and are integrated in one body. Therefore, the battery module 30 is highly powered, compact and has excellent handling. Particularly, for the single cells 20 constituting the respective assembled batteries 23 housed in the module case 31, the laminate cells 1 or 10 are used, each of which has a structure in which the positive and negative tabs 5 and 7 are drawn outward from the end edges of the long sides of the cell package. Therefore, high power can be obtained for each of the single cells 20. In this connection, the battery module 30 is suitable for, for example, use in an electric vehicle regarding high power.

Fifth Embodiment

Figure 9:
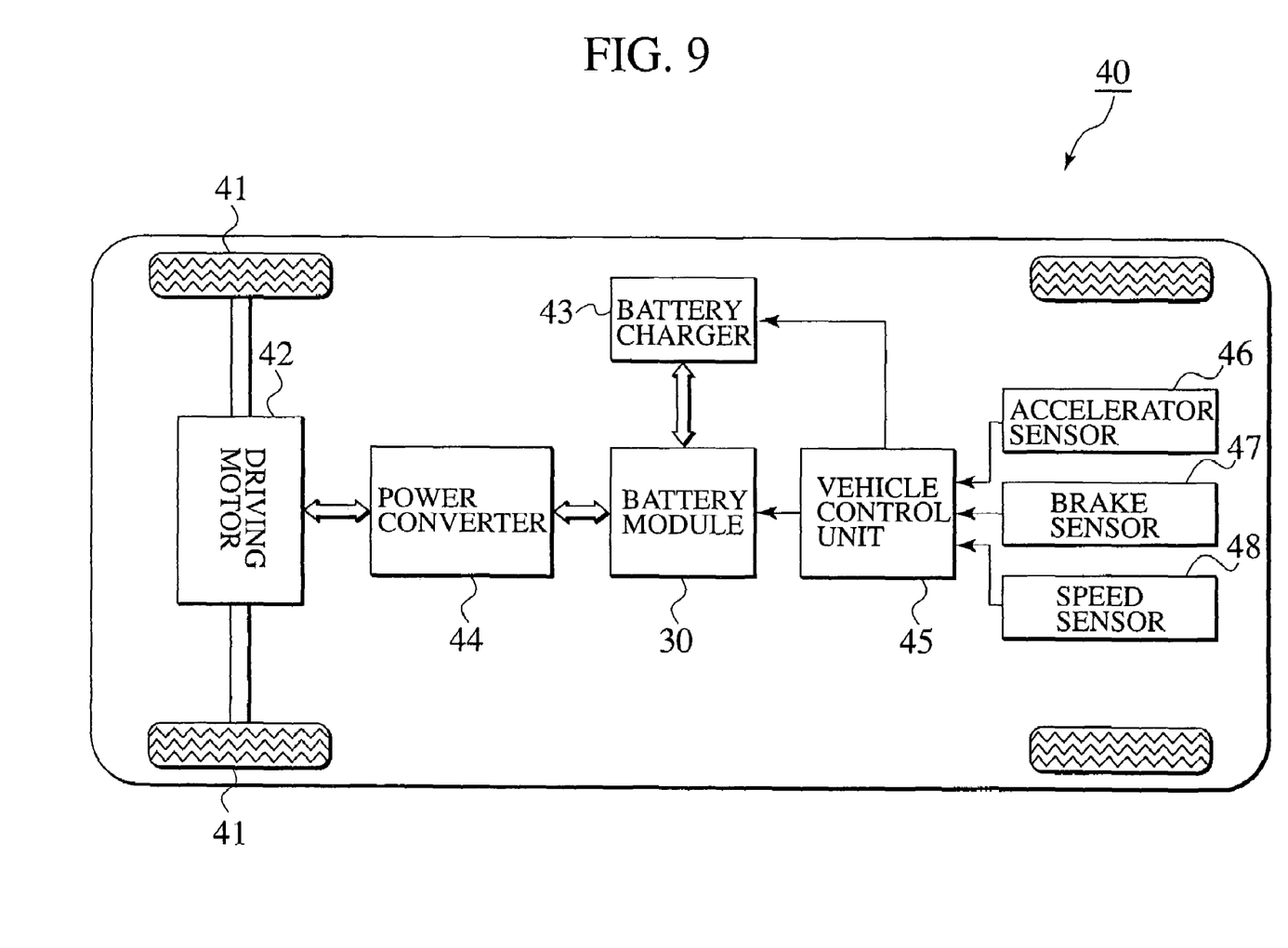
FIG. 9 is a block diagram schematically illustrating a drive system of an electric vehicle according to the present invention.

Next, an example of an electric vehicle having the battery module 30 as described above mounted thereon will be described with reference to FIG. 9. FIG. 9 schematically illustrates the drive system of the electric vehicle 40 of this embodiment.

As illustrated in FIG. 9, in the electric vehicle 40 of this embodiment, the above-described battery module 30 is used as a power source for the driving motor 42 driving the drive wheels 41. This battery module 30 is designed to be charged by the battery charger 43, and supplies predetermined power to the driving motor 42 through the power converter 44 according to needs. In addition, the battery module 30 is charged by regenerated power generated by a regenerative braking of the driving motor 42.

The charge/discharge of the battery module 30 is controlled by the vehicle control unit 45. Specifically, the vehicle control unit 45 calculates a power quantity required for the driving motor 42 based on outputs from various sensors such as the accelerator sensor 46, the brake sensor 47 and the speed sensor 48. Based on the calculated power quantity, the vehicle control unit 45 controls a power supply from the battery module 30 to the driving motor 42. In addition, the vehicle control unit 45 monitors the charge state of the battery module 30, and controls a charge from the battery charger 43 such that the charge state of the battery module 30 is maintained in an appropriate state.

In the electric vehicle 40 thus constituted, the battery module 30, which is highly powered, compact and has excellent handling, is used as the power source of the driving motor 42 driving the drive wheels 41. Particularly, as for each of the single cells constituting the assembled batteries in this module, the laminate cell is used, which has a structure in which the positive and negative tabs are drawn outward from the end edges of the long sides of the cell package. Thus, high power can be obtained, and high running performance can be realized.

Note that, though the above has been described by taking, as an example, the electric vehicle 40 which runs driven by the driving motor 42, it is also possible to apply the present invention to a so-called hybrid car which runs via a combination of an engine and the driving motor. Specifically, also in the case where the present invention is applied to the hybrid car, the battery module 30 as described above can be used as the power source of the driving motor.

The entire content of Japanese Patent Application No. P2002-242104 with a filing date of Aug. 22, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A laminate cell, comprising:
a power generating element formed by sequentially stacking positive electrode plates and negative electrode plates while interposing separators therebetween;
a cell package formed of a metal composite film, the cell package hermetically sealing the power generating element and an electrolyte;
a positive tab connected to the positive electrode plates; and
a negative tab connected to the negative electrode plates,
wherein the power generating element and the cell package have approximately rectangular plane shapes,
the positive tab and the negative tab are drawn outward from end edges of long sides of the cell package,
the positive tab and the negative tab have approximately rectangular plane shapes, and long side lengths of the positive tab and the negative tab are longer than a short side length of the cell package and are shorter than a long side length of the cell package, and
opening holes are provided in portions of the positive tab and negative tab which, are overlapped with the end edges of the long sides of the cell package.

2. An assembled battery, comprising:
a laminate cell according to claim 1,
wherein the assembled battery is formed by interconnecting any of a plurality of the laminate cells and a plurality of laminate cell groups electrically in series, each of the laminate cell group being formed by interconnecting a plurality of the laminate cells electrically in parallel.

3. A battery module, comprising:
an assembled battery according to claim 2,
wherein the battery module is formed by electrically interconnecting a plurality of the assembled batteries and housing the plurality of electrically interconnected assembled batteries in a module case.

4. An electric vehicle, comprising:
a battery module according to claim 3,
wherein the battery module is used as a power source for a driving motor driving drive wheels.

5. A laminate cell, comprising:
a cell package formed of a metal composite film;
a power generating element formed by sequentially stacking positive electrode plates and negative electrode plates while interposing separators therebetween, the power generating element and an electrolyte being hermetically sealed in a space formed by the cell package;
a positive tab connected to the positive electrode plates; and
a negative tab connected to the negative electrode plates,
wherein the power generating element, the cell package, the positive and negative tabs have approximately rectangular plane shapes,
the positive and negative tabs are drawn outward from end edges of long sides of the cell package, and
long side lengths of the positive and negative tabs are longer than a short side length of the power generating element and are shorter than a long side length of the power generating element, and are substantially the same both inside and outside of the space of the cell package.

6. A laminate cell according to claim 5,
wherein opening holes are provided in portions of the positive tab and negative tab, which are overlapped with the end edges of the long sides of the cell package.

7. An assembled battery, comprising:
a laminate cell according to claim 5,
wherein the assembled battery is formed by interconnecting any of a plurality of the laminate cells and a plurality of laminate cell groups electrically in series, each of the laminate cell group being formed by interconnecting a plurality of the laminate cells electrically in parallel.

8. A battery module, comprising;
an assembled battery according to claim 7,
wherein the battery module is formed by electrically interconnecting a plurality of the assembled batteries and housing the plurality of electrically interconnected assembled batteries in a module case.

9. An electric vehicle, comprising:
a battery module according to claim 8,
wherein the battery module is used as a power source for a driving motor driving drive wheels.

10. A laminate cell, comprising:
a cell package formed of a metal composite film;
a power generating element formed by sequentially stacking positive electrode plates and negative electrode plates while interposing separators therebetween, the power generating element and an electrolyte being hermetically sealed in a space formed by the cell package;
a positive tab connected to the positive electrode plates through positive leads; and
a negative tab connected to the negative electrode plates through negative leads,
wherein the power generating element, the cell package, the positive and negative tabs, and the positive and negative leads have approximately rectangular plane shapes,
the positive and negative tabs are drawn outward from end edges of long sides of the cell package, and
long side lengths of the positive and negative tabs are longer than long side lengths of the positive and negative leads and are shorter than a long side length of the power generating element, and are substantially the same both inside and outside of the space of the cell package.

11. A laminate cell according to claim 10,
wherein opening holes are provided in portions of the positive tab and negative tab, which are overlapped with the end edges of the long sides of the cell package.

12. An assembled battery, comprising:
a laminate cell according to claim 10,
wherein the assembled battery is formed by interconnecting any of a plurality of the laminate cells and a plurality of laminate cell groups electrically in series, each of the laminate cell group being formed by interconnecting a plurality of the laminate cells electrically in parallel.

13. A battery module, comprising;
an assembled battery according to claim 12,
wherein the battery module is formed by electrically interconnecting a plurality of the assembled batteries and housing the plurality of electrically interconnected assembled batteries in a module case.

14. An electric vehicle, comprising:
a battery module according to claim 13,
wherein the battery module is used as a power source for a driving motor driving drive wheels.

* * * * *